July 14, 1970

R. A. RAVENEL 3,520,554

VEHICLE WHEEL SUSPENSION

Filed July 15, 1968

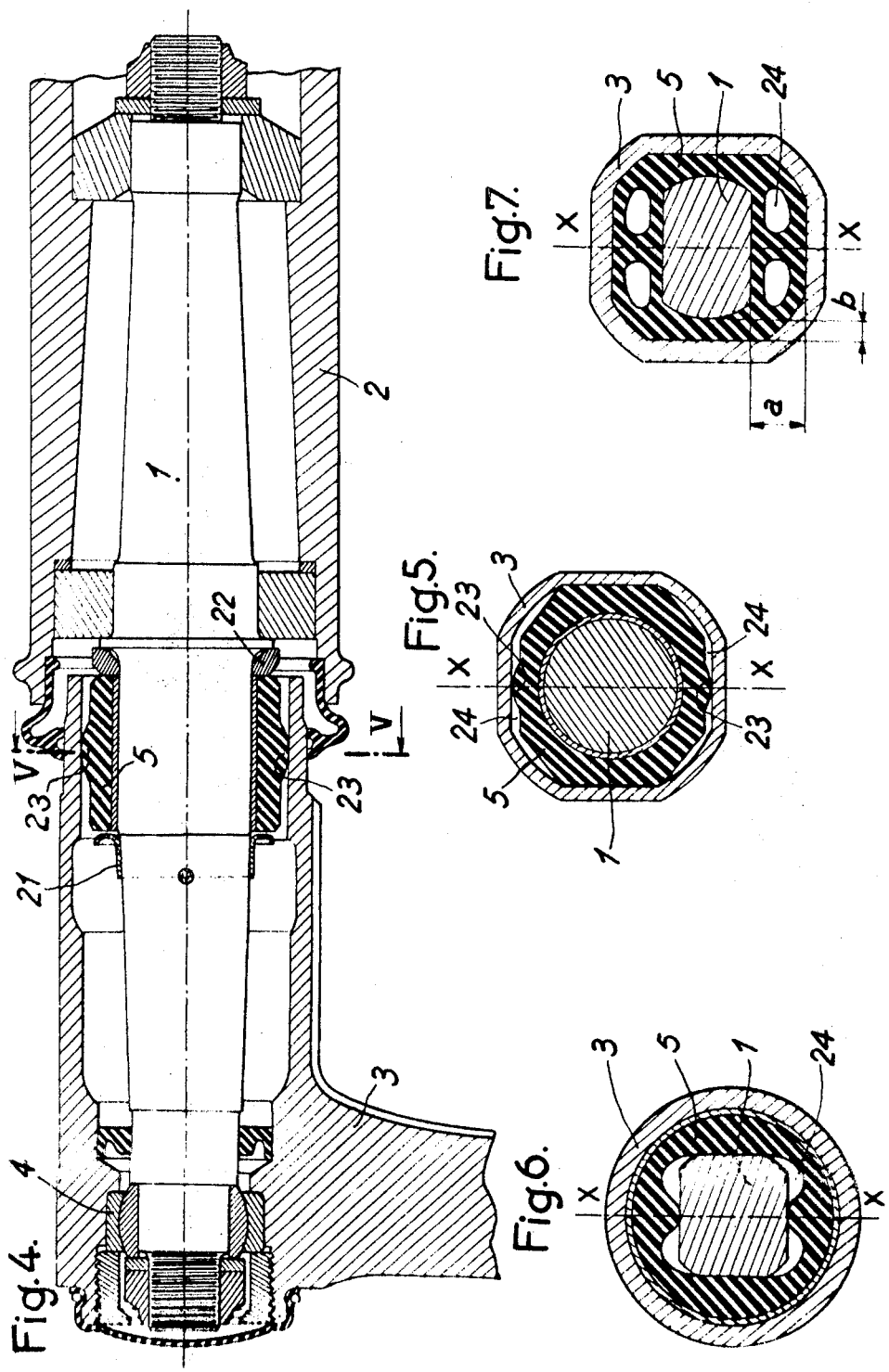

United States Patent Office 3,520,554
Patented July 14, 1970

3,520,554
VEHICLE WHEEL SUSPENSION
Raymond A. Ravenel, Sceaux, France, assignor to Societe Anonyme Andre Citroen, Paris, France, a company of France
Filed July 15, 1968, Ser. No. 744,712
Claims priority, application France, July 27, 1967, 115,565; May 17, 1968, 152,337
Int. Cl. B60g *11/22*
U.S. Cl. 280—124                                   19 Claims

ABSTRACT OF THE DISCLOSURE

This longitudinal-flexibility suspension for vehicle wheels, wherein one of the oscillating members supporting the wheel is pivoted to a substantially horizontal and longitudinal shafts rigid with the frame of the vehicle, with the interposition of a bearing located in the vicinity of the tranverse vertical plane containing the center of the wheel, and abutment means, is characterised in that said bearing is a spherical, non-elastic bearing. In addition, the aforesaid flexible socket constituting said abutment means may have a different flexibility according to the radial directions of the stress applied to said socket.

BACKGROUND OF THE INVENTION

The present invention relates in general to an independent suspension for the wheels of automobile vehicles and has specific reference to an independent suspension affording a limited horizontal and longitudinal displacement of a wheel in relation to the frame of the vehicle.

To damp out the shocks applied in a horizontal direction to the wheels, or the horizontal components of non-vertical shocks, and also to reduce the noise developing in a rolling vehicle, it is known that an advantageous solution consists in so connecting the wheels to the frame of the vehicle that their usually vertical beat be completed by the possibility of a limited horizontal and longitudinal movement in relation to the frame.

In the specific case of a wheel having its hub supported by two superposed swinging members or wishbones, suspension systems are already known wherein the longitudinal mobility of the wheel in relation to the frame is obtained by pivoting one of these members on a substantially horizontal and longitudinal shaft rigid with the frame, with the interposition of a flexible resilient bearing in the vicinity of the verticle transverse plane containing the wheel center, the very moderate longitudinal movements thus permitted being limited by resilient abutment and check means of miscellaneous design.

However, the above-mentioned solutions are not completely satisfactory, for the elasticity of the resilient bearing disposed near said vertical tranverse plane affords transverse displacements of the wheel hub which are likely to cause the oscillation of the mean plane of said wheel. Moreover, in the case of a steering axle, this oscillation is attended by steering variations as a consequence of the resulting reaction against the normally fixed steering elements.

These various effects are obviously detrimental to the road holding properties of the vehicle.

On the other hand, when another resilient bearing is used as an elastic abutment, the design of this abutment is made more complicated by the use of several different elastic and rigid component elements.

It is therefore the essential object of this invention to avoid the above-listed inconveniences.

Moreover, this invention has for its object the provision of a suspension for vehicle wheels which is characterized by a longitudinal elasticity and by a very simple design using only a very small number of component elements in relation to hitherto known suspension systems of this general type.

SUMMARY OF THE INVENTION

To this end, this longitudinal-flexibility suspension for vehicle wheels, wherein one of the oscillating members supporting the wheel is pivoted to a substantially horizontal and longitudinal shaft rigid with the frame of the vehicle, with the interposition of a bearing located in the vicinity of the transverse vertical plane containing the center of the wheel, and abutment means, is characterized in that said bearing is a spherical, non-elastic bearing.

According to a complementary feature of the invention, the aforesaid flexible abutment means may consist of a flexible socket acting as a second pivot bearing to said oscillating member while permitting and resiliently limiting the minor longitudinal displacement of the wheel in relation to the vehicle frame.

The aforesaid spherical bearing may consist indifferently of a ball-and-socket device or of a spherical-race bearing.

On the other hand, the steering elements are so disposed that the longitudinal displacements of the wheel hub in relation to the frame cannot cause an undesired steering effect.

With this non-elastic spherical bearing the wheel-supporting oscillating member is safely held against transverse movement and therefore any transverse displacement of the wheel hub is safely avoided.

Moreover, the abutment means limiting the longitudinal displacements of the wheels are considerably simplified since they consist only of a single resilient member interposed between said oscillating member and its pivot shaft rigid with the frame. In addition, the aforesaid flexible socket constituting said abutment means may have a different flexibility according to the radial directions of the stress applied to said socket.

More particularly, this flexibility is advantageously greater in the horizontal direction in order to facilitate the longitudinal movements or beats of the end portion of said oscillating member and therefore of the wheel connected thereto.

Furthermore, the socket flexibility may be variable as a function of the beat amplitude, this variable flexibility, especially in the horizontal direction, being greater in the case of low-amplitude beats.

Other advantages and features of this invention will appear more clearly as the following description of a few exemplary forms of embodiment of the invention proceeds with reference to the accompanying drawing, in which:

BRIEF DESCRIPTION OF THE DRAWINGS

FIG. 4 is a horizontal section similar to FIG. 2 but showing a modified form of embodiment of the abutment means;

FIG. 5 is a section taken along the line V—V of FIG. 4;

FIGS. 6 and 7 are sectional views similar to FIG. 5, but showing modified forms of embodiment.

DESCRIPTION OF THE PREFERRED EMBODIMENT

Figure 1:
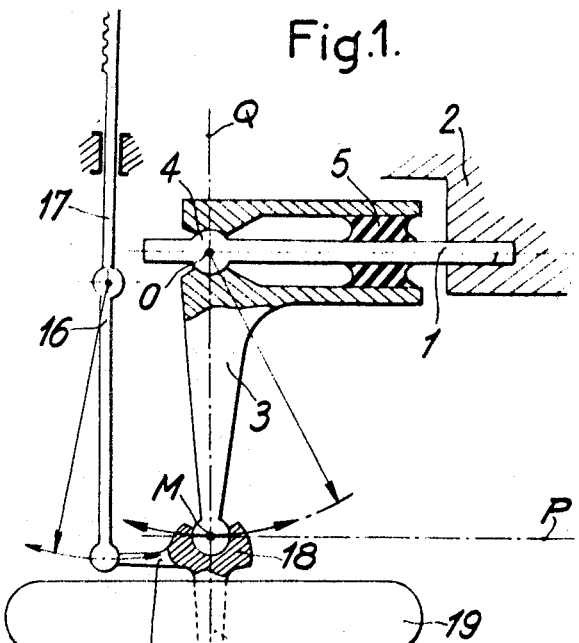
FIG. 1 is a diagrammatic plan view illustrating the principle of operation of the suspension of this invention.

The device illustrated diagrammatically in FIG. 1 comprises essentially a longitudinal shaft 1 rigidly secured to the frame 2 of the vehicle and having pivotally mounted thereon, by means of two bearings 4 and 5, one of the oscillating members or wheel carrier arms, of which the arm proper 3 is connected to the hub 20 of a wheel 19 by means of a universal joint 18, the other oscillating member being omitted for the sake of clarity in the drawing.

The bearing 4, according to this invention, is a non-elastic spherical bearing and its center O lies in close vicinity of the vertical transverse plane Q containing the center M of the pivotal connection between the arm 3 and the wheel hub 20. Preferably, and as shown in FIG. 1, the center O lies in this transverse plane Q.

The bearing 5 consisting of a flexible socket or sleeve has a radial elasticity permitting limited horizontal oscillation of the wheel arm 3 about the bearing 4 whereby the point M can describe a small circular arc centered at O and substantially coincident with the longitudinal vertical plane P containing the point M when the latter is in its inoperative position.

Thus, the desired small longitudinal movements of the wheel-hub assembly, as required during sudden accelerations or brake applications, are obtained, these movements being also permitted when a shock having a horizontal longitudinal component is applied to the wheel, without allowing a possible horizontal transverse component of said shock to have any influence on the suspension and cause a transverse displacement of said point M.

Besides, a vertical displacement of said point M may normally superimpose itself to this longitudinal movement of point M in case of a vertical component of a shock applied to the wheel, this vertical movement being produced against the action of conventional return means (not shown) acting upon the wheel arm 3.

Figure 2:
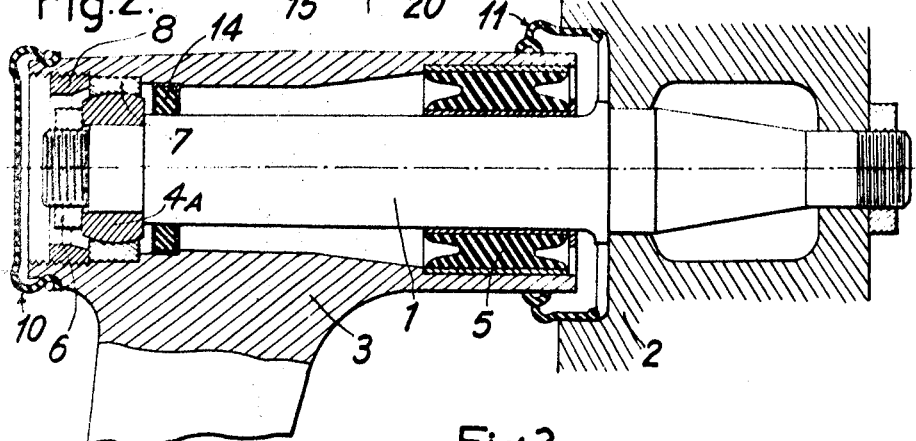
FIG. 2 is a fragmentary horizontal section showing a first form of embodiment of the invention.

A first form of embodiment of this device is illustrated in FIG. 2 showing a shaft rigidly secured in overhanging relationship to the frame 2.

In this specific form of embodiment the spherical bearing consists of a ball-shaped member 4A secured to said shaft 1 by means of a nut 6 and fitting in a seat member 7 retained in the transverse bore of arm 3 by a screw-threaded ring 8.

Figure 3:
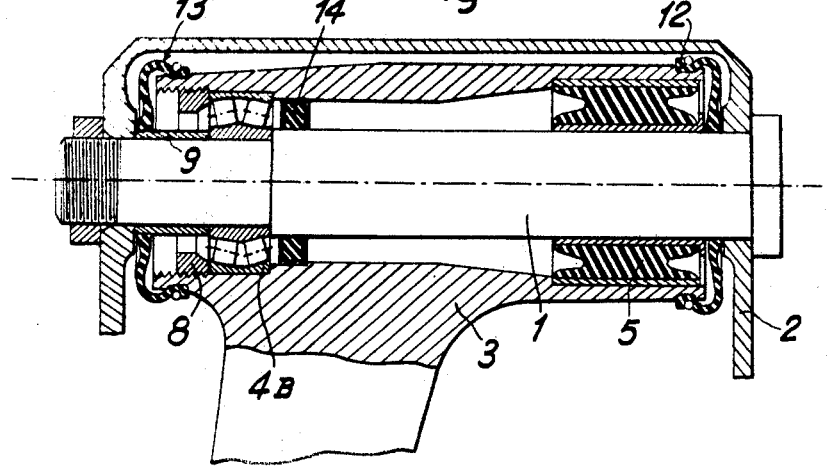
FIG. 3 is a view similar to FIG. 2 but showing another form of embodiment of the invention.

In a second form of embodiment illustrated in FIG. 3 the shaft 1 is mounted as in a fork between parallel flanges pertaining to the frame 2, and the spherical bearing consists of a spherical-race roller-contact bearing 4B having its outer race retained in the arm 3 by a screw-threaded ring 8, the inner race being pressed against a shoulder of shaft 1 by means of a tubular distance-piece 9 reacting against the inner face of the adjacent flange of frame 2.

In either forms of embodiment (FIGS. 2 and 3) the bearing 5 consists of a resilient socket, adapted or not to slide and rotate about the shaft 1 and/or in the arm 3.

The fluid-tightness of bearings 4 and 5 is obtained by using flexible seals 10, 11 in the form of embodiment of FIG. 2, and 12, 13 in the case of the form of embodiment of FIG. 3, these seals fitting over the two ends of the hub of arm 3 and preventing the ingress of foreign substances as well as the leakage of lubricants if any are used.

If only one of the bearings has to be lubricated, or if the lubricants used therein differ, an annular packing 14 may advantageously be fitted in the annular chamber formed between the two bearings.

Besides, in the case of a steering wheel, to avoid any influence of the longitudinal wheel displacements on the steering of the wheel, the steering elements may be disposed as shown in FIG. 1.

A steering arm 15 is secured to the stub axle 20 of the wheel 19 in the vicinity of the plane of arm 3 containing the aforesaid point M and the shaft 1, a link 10 connects this lever to a steering control bar 17, for example to the rack-and-pinion steering gear, and for the above-given reasons, the link 16 is parallel or substantially parallel to the axis OM and has the same length as this axis.

Whereas in the above-described forms of embodiment the flexible socket 5 has a uniform elasticity in all directions, according to another feature characterizing this invention the flexible socket 5 illustrated in FIGS. 4 and 5 is so shaped that it has not only a greater flexibility in the horizontal direction, i.e. in the plane of FIG. 4 and in the direction X—X of FIG. 5, but also a flexibility variable as a function of the amplitude of the longitudinal beats of the end of the arm of said oscillating member 3.

To this end, cavities 24 are formed between the socket 5 and the hub of member 3, the portions 23 of this socket which bear against the inner wall of said hub in the direction X—X being dome-shaped, so that the reaction force of the socket increases with the beat amplitude.

Moreover, the socket 5 is locked against rotation with respect to the shaft 1 and/or to the hub of member 3, so that its orientation remains substantially constant as well as the direction of its maximum flexibility. In the example illustrated in FIGS. 4 and 5, the socket is locked against rotation in relation to said member 3 by means of a non-circular fitting, whereas it can rotate with respect to the shaft 1 due to the provision of an intermediate bushing. In the example illustrated in FIG. 6, the socket is held against rotation in relation to shaft 1 but can rotate with respect to hub 3; FIG. 7 illustrates a typical example of a mounting holding the socket against rotation with respect both to shaft 1 and to hub 3.

Moreover, as shown in FIGS. 6 and 7, the cavities 24 are formed between the socket 5 and shaft 1 on the one hand, and within the very mass of this socket, in the form of hollow cells, on the other hand; alternately, desired variations in the flexibility of the assembly may be obtained by providing a socket of which the various sections have different elastic characteristics due to the use of either a non-homogeneous material or a plurality of materials, or by resorting to differences in thickness (see *a* and *b*, FIG. 7).

Of course, many modifications obvious to those conversant with the art may be brought to the different forms of embodiment illustrated in the drawing and described hereinabove, without departing from the spirit and scope of the invention.

Thus, for instance, the spherical-race rolling-contact bearing illustrated in FIG. 3 may easily be adapted to the overhanging shaft 1 of FIG. 2, and vice-versa the ball-joint of FIG. 2 may be adapted to the shaft of FIG. 3.

What I claim is:

1. A suspension for a wheeled automotive vehicle having a frame, said suspension having a longitudinal flexibility for a vehicle wheel, which comprises at least one oscillating member supporting the wheel, a substantially horizontal and longitudinal shaft rigid with said frame, a bearing located substantially in the transverse vertical plane containing the center of said wheel for pivoting said oscillating member to said shaft, and abutment means between said member and said shaft and spaced from said bearing for limiting the transverse movements of said oscillating member in relation to said shaft, wherein said bearing is a non-elastic spherical bearing.

2. A suspension as set forth in claim 1, wherein said abutment means consists of a flexible socket constituting a second bearing pivotally mounting said oscillating member to said shaft.

3. A suspension as set forth in claim 2, wherein said oscillating member is an arm comprising a hub pivoted to said shaft and receiving said bearings.

4. A suspension as set forth in claim 3, wherein said non-elastic spherical bearing consists of a ball-joint fitted on said shaft and co-acting with a seat-forming member locked in the hub of said arm.

5. A suspension as set forth in claim 3, wherein said spherical bearing is a spherical-race rolling-contact bearing having its inner race fitted to said shaft and its outer race locked in said hub of said arm.

6. A suspension as set forth in claim 3, wherein said shaft is mounted in overhanging relationship to a frame member.

7. A suspension as set forth in claim 3, wherein said frame comprises a channel member having vertically disposed parallel flanges and said shaft is mounted between said flanges.

8. A suspension as set forth in claim 3, wherein seals are provided at the ends of the hub of said arm.

9. A suspension as set forth in claim 8, wherein an annular packing is provided in the annular cavity formed between the two bearings.

10. A suspension as set forth in claim 2, wherein said flexible socket has a different flexibility according to the radial directions of the stress applied to the socket.

11. A suspension as set forth in claim 10, wherein said flexible socket has portions having a greater flexibility in a substantially horizontal direction.

12. A suspension as set forth in claim 11, wherein said portion have a flexibility variable as a function of the amplitude of the radial beats of the hub of said oscillating member in relation to said shaft.

13. A suspension as set forth in claim 12, wherein said portions are formed on the surface of said flexible socket, at diametrically opposite positions.

14. A suspension as set forth in claim 13, wherein said oscillating member includes a hub-pivoted on said shaft and each one of said portions consists of a dome-shaped projection engaging the inner wall of said hub and recesses formed between said hub and said flexible socket on either side of said projection, so as to leave a gap between said socket and said inner wall.

15. A suspension as set forth in claim 13, wherein each one of said portions consists of a dome-shaped projection contacting said shaft and recesses formed in said flexible socket on either side of said projection, so as to leave a gap between said socket and said shaft.

16. A suspension as set forth in claim 12, wherein said portions consist of empty cells formed in said socket.

17. A suspension as set forth in claim 11, wherein the thicknesses of said flexible socket differ in the different radial directions.

18. A suspension as set forth in claim 1, wherein said vehicle wheel is a steering wheel, a steering lever rigid with the wheel hub, a steering control bar, and a link interconnecting said lever and bar.

19. A suspension as set forth in claim 18, wherein said oscillating member includes an arm pivoted to said steering wheel hub and said link is parallel to said arm and has a length equal to the distance from the center of the pivotal mounting of said arm on said wheel hub to the center of said spherical bearing.

References Cited

UNITED STATES PATENTS

| | | |
|---|---|---|
| 1,932,445 | 10/1933 | Burns. |
| 2,729,442 | 1/1956 | Neidhart _____ 267—57.1 X |
| 2,836,413 | 5/1958 | Hirst _____ 280—124.1 X |

A. HARRY LEVY, Primary Examiner

U.S. Cl. X.R.

267—25, 57.1; 280—96.2